(12) United States Patent
Barrett et al.

(10) Patent No.: US 12,128,894 B2
(45) Date of Patent: Oct. 29, 2024

(54) ADAPTIVE CRUISE CONTROL

(71) Applicant: Ford Global Technologies, LLC, Dearborn, MI (US)

(72) Inventors: Jordan Barrett, Milford, MI (US); Brendan Francis Diamond, Grosse Pointe, MI (US); Andrew Denis Lewandowski, Sterling Heights, MI (US); Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 344 days.

(21) Appl. No.: 17/527,437

(22) Filed: Nov. 16, 2021

(65) Prior Publication Data

US 2023/0150496 A1   May 18, 2023

(51) Int. Cl.
  *B60W 30/14* (2006.01)
  *B60S 1/08* (2006.01)
  *B60W 30/16* (2020.01)
  *B60W 40/02* (2006.01)
  *B60W 40/105* (2012.01)
  *B60W 50/00* (2006.01)
  *B60W 50/14* (2020.01)

(52) U.S. Cl.
  CPC ......... *B60W 30/143* (2013.01); *B60S 1/0896* (2013.01); *B60W 30/16* (2013.01); *B60W 40/02* (2013.01); *B60W 40/105* (2013.01); *B60W 50/14* (2013.01); *B60W 2050/0083* (2013.01); *B60W 2300/14* (2013.01); *B60W 2540/049* (2020.02); *B60W 2555/20* (2020.02); *B60W 2556/45* (2020.02)

(58) Field of Classification Search
  CPC .... B60W 30/143; B60W 30/16; B60W 40/02; B60W 40/105; B60W 50/14; B60W 2540/049; B60W 2556/45; B60W 2555/20; B60W 2050/0083; B60W 2300/14; B60S 1/0896
  See application file for complete search history.

(56) References Cited

U.S. PATENT DOCUMENTS

| | | | |
|---|---|---|---|
| 8,315,775 B2 | 11/2012 | Biondo et al. | |
| 9,187,094 B2 | 11/2015 | Han | |
| 9,827,986 B2 | 11/2017 | Pilutti et al. | |
| 9,969,393 B2 | 5/2018 | Rebhan et al. | |
| 2005/0246089 A1 | 11/2005 | Muehlbauer | |
| 2017/0282917 A1* | 10/2017 | Pilutti | B60W 30/143 |
| 2018/0088572 A1* | 3/2018 | Uchida | B60W 50/082 |
| 2020/0001869 A1* | 1/2020 | Lotz | B60W 30/146 |
| 2020/0130687 A1* | 4/2020 | Gyulai | B60W 30/16 |
| 2020/0290612 A1* | 9/2020 | Yamaguchi | B60W 40/06 |
| 2022/0242409 A1* | 8/2022 | Park | B60W 40/06 |

* cited by examiner

*Primary Examiner* — Jaime Figueroa
*Assistant Examiner* — Mohamad O El Sayah
(74) *Attorney, Agent, or Firm* — Frank A. MacKenzie; Bejin Bieneman PLC

(57) ABSTRACT

A computer includes a processor and a memory storing instructions executable by the processor to receive a speed of windshield wipers of a vehicle, adjust a setting for an adaptive cruise control of the vehicle based on the speed of the windshield wipers, and instruct a propulsion of the vehicle to operate in accordance with the adjusted setting of the adaptive cruise control.

20 Claims, 4 Drawing Sheets

ADAPTIVE CRUISE CONTROL

BACKGROUND

Some vehicles are equipped with adaptive cruise control. Cruise control maintains a vehicle at a set speed without an operator providing input through an accelerator pedal. Adaptive cruise control is cruise control that lowers the speed of the vehicle when a slower-moving vehicle is ahead of the vehicle in order to maintain a distance from the slower-moving vehicle. Adaptive cruise control can also raise the speed of the vehicle back to the set speed when the slower-moving vehicle is no longer ahead of the vehicle.

DETAILED DESCRIPTION

Figure 1:
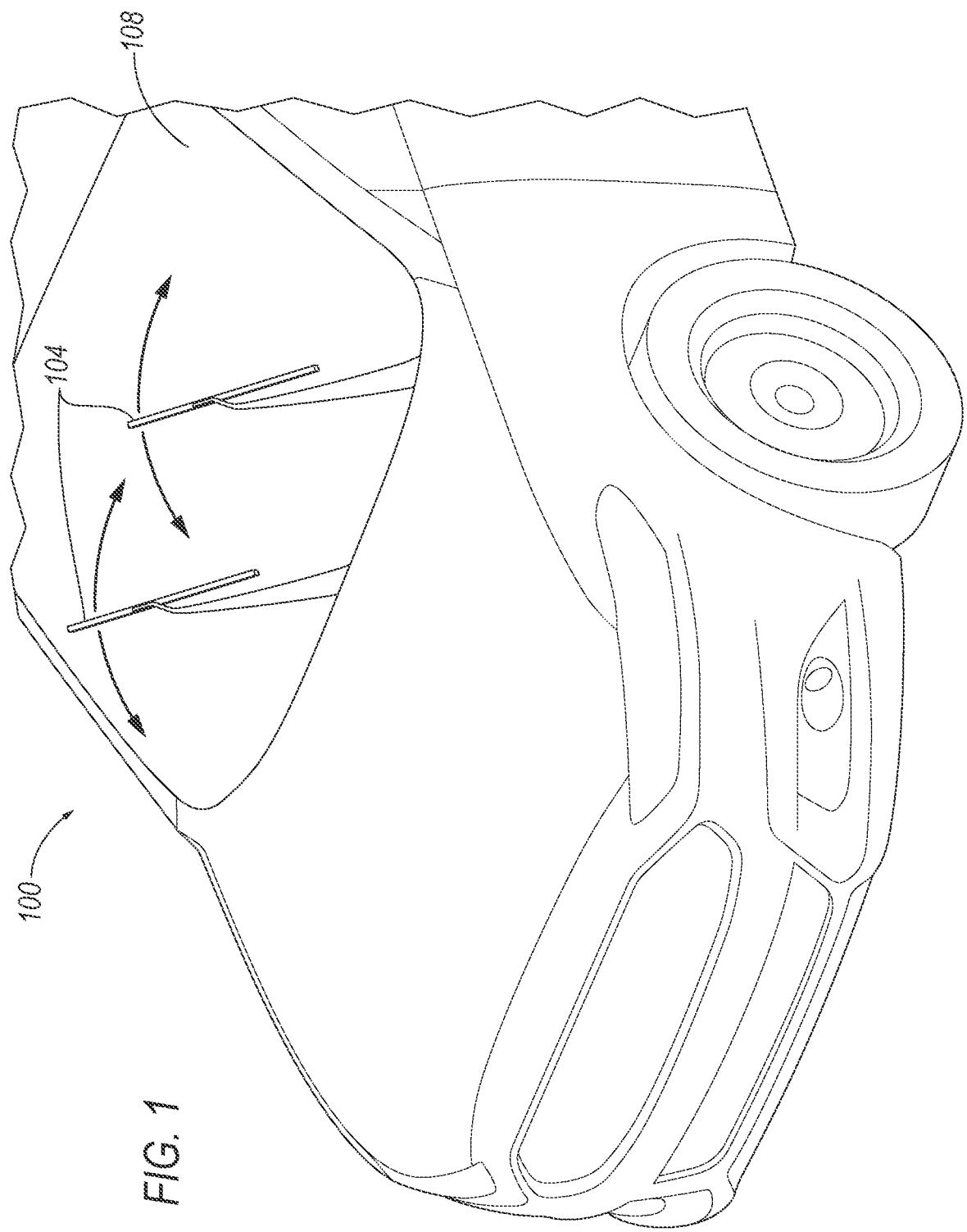
FIG. 1 is a perspective view of a portion of an example vehicle.

The systems and techniques described herein provide adjustment of the settings for an adaptive cruise control system. The system can receive a speed of windshield wipers of a vehicle, adjust one or more settings for an adaptive cruise control of the vehicle based on the speed of the windshield wipers, and instruct a propulsion and/or brake system of the vehicle to operate in accordance with the adjusted setting of the adaptive cruise control. The settings can include, e.g., a target speed and/or a following distance. The system adjusts the settings of the adaptive cruise control, i.e., adjusts how the vehicle propulsion advantageously operates, in a computationally efficient manner that is typically more efficient than techniques that use data from sensors. Moreover, the systems and techniques disclosed herein are further advantageous for not requiring sensors.

A computer includes a processor and a memory storing instructions executable by the processor to receive a speed of windshield wipers of a vehicle, adjust a setting for an adaptive cruise control of the vehicle based on the speed of the windshield wipers, and instruct a propulsion of the vehicle to operate in accordance with the adjusted setting of the adaptive cruise control.

The adjusted setting may include a target speed of the vehicle. The instructions to adjust the setting for the adaptive cruise control may include instructions to decrease the target speed of the vehicle in response to an increase of the speed of the windshield wipers.

The adjusted setting may include a following distance from a leading vehicle. The instructions to adjust the setting for the adaptive cruise control may include instructions to increase the following distance in response to an increase of the speed of the windshield wipers.

The instructions to adjust the setting for the adaptive cruise control may include instructions to adjust the setting to a value determined by a gain applied to the speed of the windshield wipers. The instructions may further include instructions to adjust the gain in response to an input from an operator of the vehicle.

The instructions may further include instructions to adjust the gain in response to a number of occupants of the vehicle.

The instructions may further include instructions to adjust the gain based on a characteristic of a trailer hitched to the vehicle.

The instructions may further include instructions to adjust the gain based on crowdsourced data received from a remote server.

The instructions to adjust the setting for the adaptive cruise control may include instructions to adjust the setting based on the speed of the windshield wipers in response to receiving data indicating inclement weather. The instructions may further include instructions to, while continuing to receive data indicating the inclement weather, repeatedly adjust the setting based on the speed of the windshield wipers.

The instructions may further include instructions to, in response to receiving data indicating inclement weather, output a message to an operator of the vehicle, and, in response to receiving an input canceling adjustment of the setting of the adaptive cruise control, adjust the setting of the adaptive cruise control to a default value.

The instructions may further include instructions to, in response to receiving data indicating that inclement weather has ceased, adjust the setting of the adaptive cruise control to a default value. The instructions may further include instructions to, in response to receiving the data indicating that the inclement weather has ceased, output a message to the operator indicating that the setting of the adaptive cruise control is being adjusted to the default value.

The instructions may further include instructions to, in response to the vehicle being turned off, adjust the setting of the adaptive cruise control to a default value.

The speed of the windshield wipers may be from a range of values including at least three values.

The instructions to instruct the propulsion to operate in accordance with the adjusted setting of the adaptive cruise control may include to instruct the propulsion to operate in accordance with the adjusted setting of the adaptive cruise control in response to an input from an operator to activate the adaptive cruise control. The instructions may further include instructions to permit manual operation of the propulsion in response to an input from the operator deactivating the adaptive cruise control.

A method includes receiving a speed of windshield wipers of a vehicle, adjusting a setting for an adaptive cruise control of the vehicle based on the speed of the windshield wipers, and instructing a propulsion of the vehicle to operate in accordance with the adjusted setting of the adaptive cruise control.

With reference to the Figures, wherein like numerals indicate like parts throughout the several views, a computer 102 includes a processor and a memory storing instructions executable by the processor to receive a speed of windshield wipers 104 of a vehicle 100, adjust at least one setting for an adaptive cruise control of the vehicle 100 based on the speed of the windshield wipers 104, and instruct a propulsion 106 of the vehicle 100 to operate in accordance with the adjusted at least one setting of the adaptive cruise control.

With reference to FIG. 1, the vehicle 100 may be any passenger or commercial automobile such as a car, a truck, a sport utility vehicle, a crossover, a van, a minivan, a taxi, a bus, etc.

The vehicle 100 includes the windshield wipers 104. The windshield wipers 104 can be any suitable type and/or arrangement for clearing moisture from an exterior of a windshield 108 of the vehicle 100, e.g., conventional, flat, hybrid, or winter blade; standard or beam arm; tandem system, opposed system, single arm, or controlled single arm; etc.

The windshield wipers 104 operate at a speed. For example, the speed can be in units of frequency, e.g., sweeps per minute. For another example, the speed can be an ordinal setting, e.g., a level in a ranked ordering. The ordinal setting can be selected from, e.g., in ascending order of speed, {off, intermittent, slow, and fast}. The wiper setting {off} means that the windshield wipers 104 are not operating, i.e., are stationary. The wiper setting {intermittent} means that the windshield wipers 104 pause between each sweep. The wipers settings {slow, fast} mean that the windshield wipers do not pause between sweeps, and the windshield wipers 104 move across the windshield 108 more quickly for the wiper setting {fast} than for the wiper setting {slow}. The set of ordinal settings can include more or fewer wiper settings, e.g., more than one intermittent setting with pauses of different lengths, more than two speeds at which the windshield wipers 104 move across the windshield 108, etc. The speed of the windshield wipers 104 is from a range of values including at least three values, e.g., a range of continuous values from zero to 60 sweeps per minutes, {off, intermittent, slow, and fast}, etc. An example of how the speed of the windshield wipers 104 can be selected is described below with respect to FIG. 4.

Figure 2:
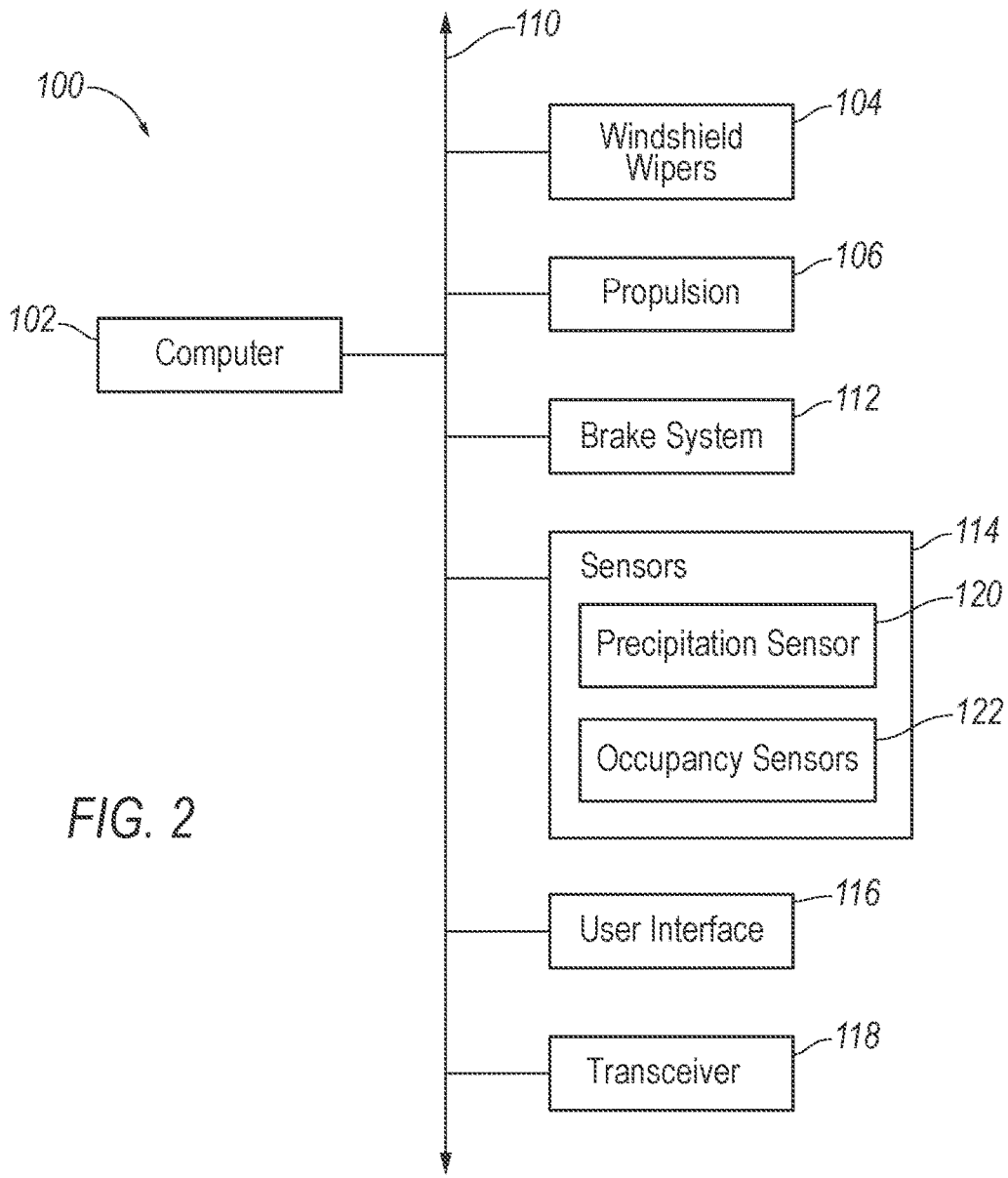
FIG. 2 is a block diagram of the vehicle.

With reference to FIG. 2, the computer 102 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 110 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to the windshield wipers 104, the propulsion 106, a brake system 112, sensors 114, a user interface 116, a transceiver 118, and other components via the communications network 110.

The propulsion 106 of the vehicle 100 generates energy and translates the energy into motion of the vehicle 100. The propulsion 106 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 106 can include an electronic control unit (ECU) or the like that is in communication with and receives input from the computer 102 and/or a human operator. The human operator may control the propulsion 106 via, e.g., an accelerator pedal and/or a gear-shift lever.

The brake system 112 is typically a conventional vehicle braking subsystem and resists the motion of the vehicle 100 to thereby slow and/or stop the vehicle 100. The brake system 112 may include friction brakes such as disc brakes, drum brakes, band brakes, etc.; regenerative brakes; any other suitable type of brakes; or a combination. The brake system 112 can include an electronic control unit (ECU) or the like that is in communication with and receives input from the computer 102 and/or a human operator. The human operator may control the brake system 112 via, e.g., a brake pedal.

The sensors 114 may provide data about operation of the vehicle 100, for example, wheel speed, wheel orientation, and engine and transmission data (e.g., temperature, fuel consumption, etc.). The sensors 114 may detect the location and/or orientation of the vehicle 100. For example, the sensors 114 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 114 may detect the external world, e.g., objects and/or characteristics of surroundings of the vehicle 100, such as other vehicles, road lane markings, traffic lights and/or signs, pedestrians, etc. For example, the sensors 114 may include radar sensors, scanning laser range finders, light detection and ranging (LIDAR) devices, and image processing sensors such as cameras.

The sensors 114 can include a precipitation sensor 120. The precipitation sensor 120 can be any sensor suitable to detect precipitation. For example, the precipitation sensor 120 may be a piezoelectric sensor coupled to the windshield 108 to detect vibrations from, e.g., precipitation. Vibration data such as amplitude and frequency may be associated with, e.g., types of precipitation such as rain or hail. Alternatively, the precipitation sensor 120 may be positioned where water from rain will pool and configured to detect such water. For example, the precipitation sensor 120 may include two electrical leads that, when connected, close a circuit; when water is present between the leads, the conductivity of water changes to allow current to flow through the circuit where previously it would not have done so, or changes how much current is flowing by a known amount. For another example, the precipitation sensor 120 may include an LED bulb, a light sensor, and possibly a prism reflecting light from the LED bulb to the light sensor; the presence of water scatters some of the light, reducing the light received by the light sensor by a known amount.

The sensors 114 can include occupancy sensors 122. The occupancy sensors 122 are configured to detect occupancy of seats of a passenger cabin of the vehicle 100. The occupancy sensors 122 may be visible-light or infrared cameras directed at the seats, weight sensors inside the seats, sensors detecting whether seatbelts for the seats are buckled, or other suitable sensors.

The user interface 116 presents information to and receives information from the operator of the vehicle 100. The user interface 116 may be located, e.g., on an instrument panel in a passenger cabin of the vehicle 100, or wherever may be readily seen by the operator. The user interface 116 may include dials, digital readouts, screens, speakers, and so on for providing information to the operator, e.g., human-machine interface (HMI) elements such as are known. The user interface 116 may include buttons, knobs, keypads, microphone, and so on for receiving information from the operator.

The transceiver 118 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 118 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, a mobile device associated with the owner of the vehicle 100, etc. The transceiver 118 may be one device or may include a separate transmitter and receiver.

Figure 3:
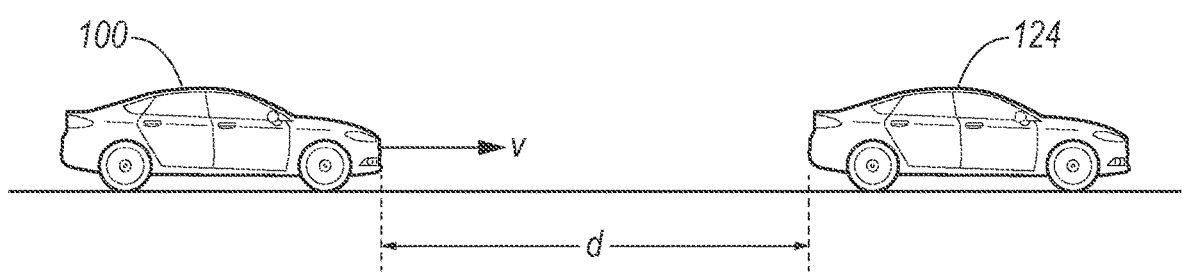
FIG. 3 is a diagrammatic side view of the vehicle following a leading vehicle.

With reference to FIG. 3, the computer 102 can be programmed to perform adaptive cruise control, i.e., to actuate the propulsion 106 and the brake system 112 according to an adaptive-cruise-control algorithm stored on the computer 102. The computer 102 can be programmed to operate the adaptive cruise control according to the settings of the adaptive cruise control. The settings can include a target speed $v_{target}$ and a following distance $d_{following}$. The computer 102 can be programmed to, according to the adaptive cruise control, actuate the propulsion 106 and/or the brake system 112 to maintain a speed v of the vehicle 100 at the target speed $v_{target}$ and to accelerate up to the target speed $v_{target}$. The target speed $v_{target}$ can be an input from the operator. The computer 102 can be programmed to, according to the adaptive cruise control, vary the speed v to maintain a distance d from a leading vehicle 124 back to the vehicle 100 at the following distance $d_{following}$ when the leading vehicle 124 is traveling below the target speed $v_{target}$. The following distance $d_{following}$ can be a function of the speed v and/or of the target speed $v_{target}$.

The computer 102 can be programmed to activate the adaptive cruise control, i.e., to begin actuating the propulsion 106 and the brake system 112 according to the adaptive-cruise-control algorithm, in response to receiving an input to activate the adaptive cruise control from the operator, e.g., via the user interface 116. The computer 102 can be programmed to deactivate the adaptive cruise control, i.e., to cease actuating the propulsion 106 and the brake system 112 according to the adaptive-cruise-control algorithm, in response to receiving an input to deactivate the adaptive cruise control from the operator, e.g., via the user interface 116 or via pressing the brake pedal. The computer 102 can lack programming to activate or deactivate the adaptive cruise control other than in response to inputs from the operator. Ultimate control over whether the adaptive cruise control is active can rest with the operator.

The settings of the adaptive cruise control can have default values. As will be discussed below, the computer 102 can be programmed to adjust the settings away from the default values based on the speed of the windshield wipers 104. The computer 102 can be programmed to operate the adaptive cruise control with the settings at the default values, e.g., when the windshield wipers 104 are off, e.g., when the speed of the windshield wipers 104 is zero. The computer 102 can be programmed to reset the settings to the default values, e.g., in response to the windshield wipers 104 being turned off. For example, a default value for the target speed $v_{target}$ can be the input speed from the operator via the user interface 116. For another example, a default value for the following distance $d_{following}$ can be a function of the speed v and/or of the target speed $v_{target}$.

The computer 102 can be programmed to adjust one or more of the settings for the adaptive cruise control based on the speed of the windshield wipers 104. For example, the computer 102 can be programmed to decrease the target speed $v_{target}$ in response to an increase of the speed of the windshield wipers 104. For another example, the computer 102 can be programmed to increase the following distance $d_{following}$ in response to an increase of the speed of the windshield wipers 104.

For example, the computer 102 can be programmed to adjust the settings to values determined by a gain applied to the speed of the windshield wipers 104. For example, the gain can be a gain constant multiplied by the speed of the windshield wipers 104, i.e., $g=g_k*s$, in which g is the gain, $g_k$ is the gain constant, and s is the speed of the windshield wipers 104. The gain can then be used to set the value of the setting, e.g., as a percent increase or decrease, e.g., $v_{target}=(1-g)*v_{target,def}$ in which $v_{target,def}$ is the default value of the target speed; or $d_{following}=(1+g)*d_{following,def}$, in which $d_{following,def}$ is the default value of the following distance.

The computer 102 can be programmed to adjust the gain g, e.g., by adjusting the gain constant $g_k$. For example, the computer 102 can be programmed to adjust the gain in response to an input from an operator of the vehicle 100, e.g., via the user interface 116. The input can, e.g., increment or decrement the gain constant $g_k$ by some value such as 10%, e.g., $g_{k,new}=0.9g_{k,old}$ or $g_{k,new}=1.1g_{k,old}$.

For another example, the computer 102 can be programmed to adjust the gain g in response to a number of occupants of the vehicle 100, e.g., the gain constant gi is a function of the number of occupants, i.e., $g_k=f(n)$, in which n is the number of occupants. The gain g, e.g., the gain constant gi, can increase as the number of occupants n increases, i.e., the settings of the adaptive cruise control become more sensitive to the speed s of the windshield wipers 104 as the number of occupants n increases.

For another example, the computer 102 can be programmed to adjust the gain g based on a characteristic of a trailer hitched to the vehicle 100, e.g., the gain constant $g_k$ can be a function of a weight of the trailer, i.e., $g_k=f(w)$, in which w is the weight of the trailer. The weight of the trailer w can be, e.g., an input by the operator to the user interface 116 or a value provided by a sensor of the trailer if the trailer is connected to the communications network 110 when hitched. The gain g, e.g., the gain constant $g_k$, can increase as the weight of the trailer w increases, i.e., the settings of the adaptive cruise control become more sensitive to the speed s of the windshield wipers 104 as the weight of the trailer w increases.

For another example, the computer 102 can be programmed to adjust the gain g based on crowdsourced data received from a remote server via the transceiver 118. For example, the computer 102 can transmit messages indicating the inputs to increment or decrement the gain constant $g_k$ described above to the remote server via the transceiver 118. The remote server can receive messages from many vehicles 100, i.e., the crowdsourced data, describing incrementing and decrementing the gain constant $g_k$, and the remote server can transmit a new gain constant $g_k$ to the vehicles 100 based on the messages. For example, if the messages indicate a greater quantity of incrementing than decrementing, the new gain constant $g_k$ can be greater than the old gain constant $g_k$.

Figure 4:
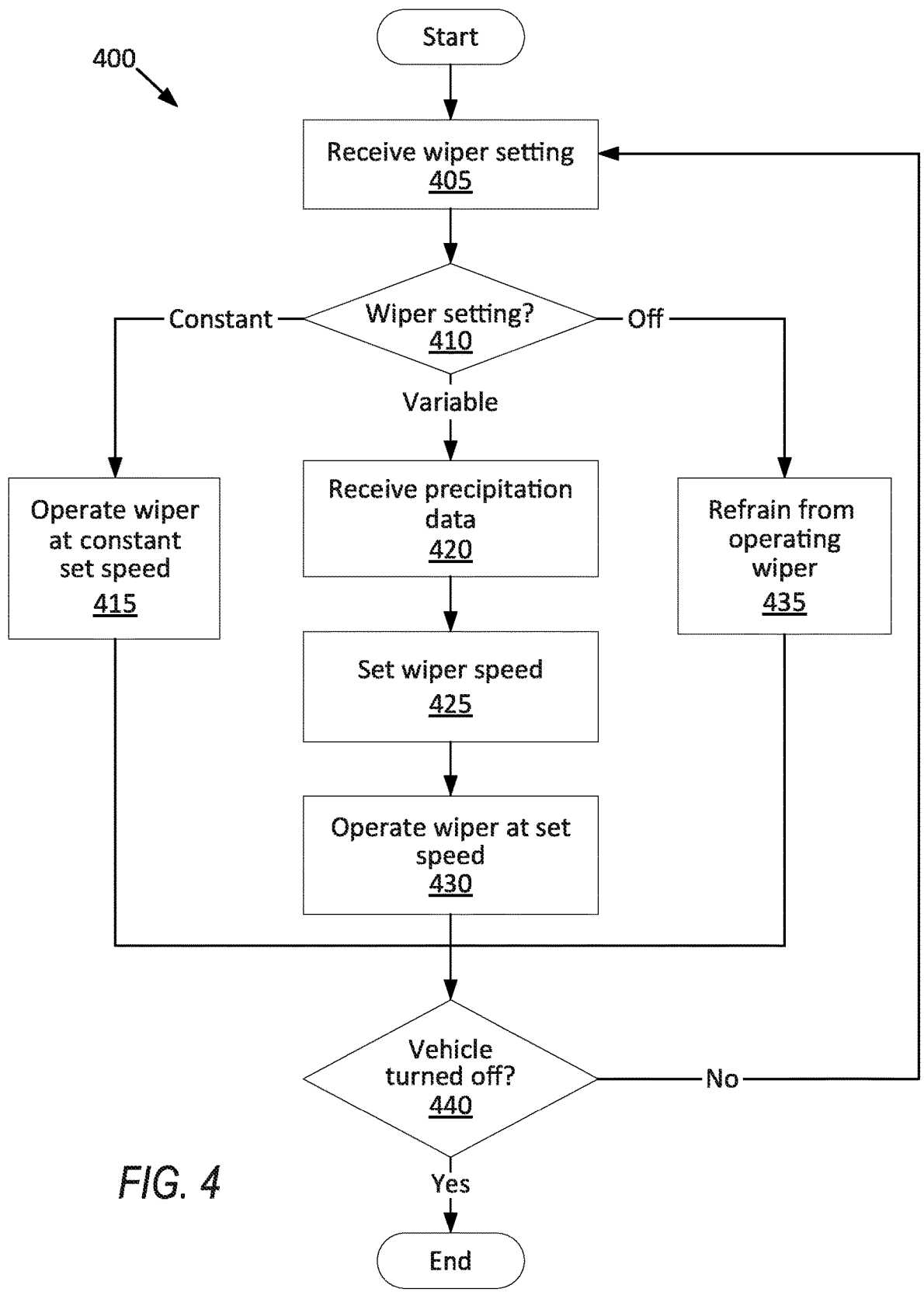
FIG. 4 is a process flow diagram of an example process for operating windshield wipers of the vehicle.

FIG. 4 is a process flow diagram illustrating an exemplary process 400 for operating the windshield wipers 104. The memory of the computer 102 stores executable instructions for performing the steps of the process 400 and/or programming can be implemented in structures such as mentioned above. As a general overview of the process 400, the computer 102 receives a wiper setting from the operator. If the wiper setting is a preset speed, the computer 102 operates the windshield wipers 104 at the preset speed. If the wiper setting is a variable speed, the computer 102 receives precipitation data, determines the speed of the windshield wipers 104, and operates the windshield wipers 104 at the determined speed. If the wiper setting is off, the computer 102 refrains from operating the windshield wipers 104. The process 400 repeats until the vehicle 100 is turned off.

The process 400 begins in a block 405, in which the computer 102 receives the wiper setting from the operator, e.g., via the user interface 116. For example, the operator can turn a dial of the user interface 116 to one of a number of discrete settings, e.g., {off, variable, intermittent, slow, fast}.

Next, in a decision block 410, the computer 102 determines whether the type of the wiper setting is a set speed, a variable speed, or off. For the example set of wiper settings above, the wipers settings {intermittent, slow, fast} are set speeds, the wiper setting {variable} is variable speed, and the wiper setting {off} is off. If the wiper setting is a set speed, the process 400 proceeds to a block 415. If the wiper setting is a variable speed, the process 400 proceeds to a block 420. If the wiper setting is off, the process 400 proceeds to a block 435.

In the block 415, the computer 102 operates the windshield wipers 104 at the set speed indicated by the wiper setting. After the block 415, the process 400 proceeds to a decision block 440.

In the block 420, the computer 102 receives precipitation data, e.g., from the precipitation sensor 120 and/or from the transceiver 118, e.g., weather data from the transceiver 118. The precipitation data indicate a current rate of precipitation, e.g., in units of inches per hour.

Next, in a block 425, the computer 102 determines the speed of the windshield wipers 104 based on the precipitation data, e.g., the speed of the windshield wipers 104 is a function of the rate of precipitation, i.e., s=f(r), in which s is the speed of the windshield wipers 104 and r is the rate of precipitation, e.g., in inches per hour. For example, the computer 102 can store a lookup table relating the speed s of the windshield wipers 104 to the precipitation rate r. The speed s of the windshield wipers 104 increases with the precipitation rate r. The determined speed s of the windshield wipers 104 can be one of the set speeds available as wiper settings, e.g., {intermittent, slow, fast}, or the determined speed can be one of a greater number of values. As the process 400 iterates, the determined speed s can change with the precipitation rate r while the operator leaves the wiper setting unchanged at {variable}.

Next, in a block 430, the computer 102 operates the windshield wipers 104 at the determined speed s determined in the block 425. After the block 430, the process 400 proceeds to the decision block 440.

In the block 435, the computer 102 refrains from operating the windshield wipers 104. If the windshield wipers 104 had been operating, the computer 102 deactivates the windshield wipers 104. After the block 435, the process 400 proceeds to the decision block 440.

In the decision block 440, the computer 102 determines whether the vehicle 100 has been turned off. If the vehicle 100 is still on, the process 400 returns to the block 405 to check the current wiper setting. If the vehicle 100 has been turned off, the process 400 ends.

Figure 5:
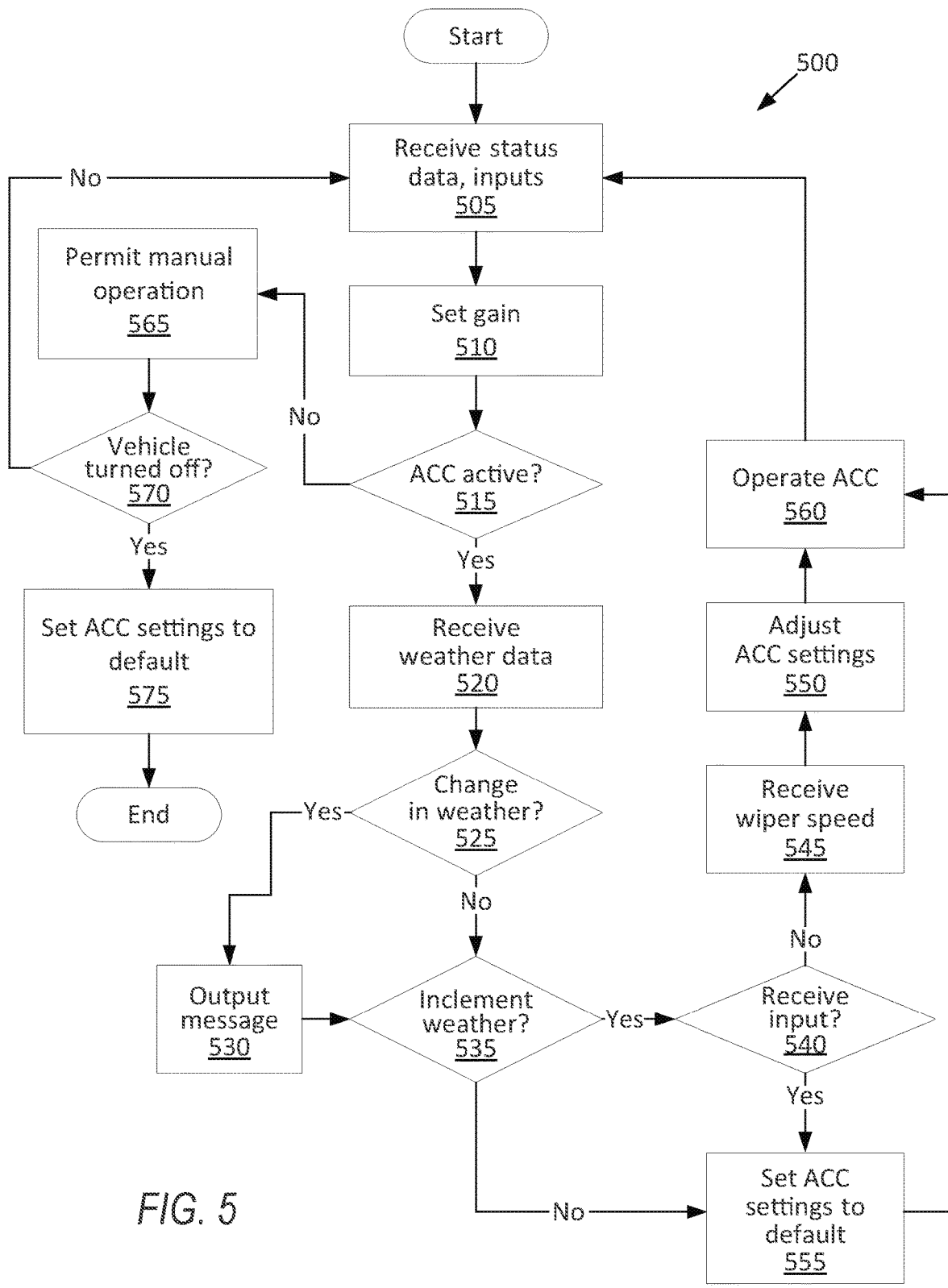
FIG. 5 is a process flow diagram of an example process for operating an adaptive cruise control of the vehicle.

FIG. 5 is a process flow diagram illustrating an exemplary process 500 for operating the adaptive cruise control. The memory of the computer 102 stores executable instructions for performing the steps of the process 500 and/or programming can be implemented in structures such as mentioned above. As a general overview of the process 500, the computer 102 receives inputs and status data and sets the gain constant $g_k$. If the adaptive cruise control is inactive, the computer 102 permits manual operation of the propulsion 106 and the brake system 112. If the adaptive cruise control is active, the computer 102 receives weather data and outputs a message if the weather has changed. If there is inclement weather and the computer 102 has not received an input canceling adjustments of the settings of the adaptive cruise control, the computer 102 receives the speed s of the windshield wipers 104 and adjusts the settings of the adaptive cruise control. If there is not inclement weather or the computer 102 has received an input canceling the adjustments of the settings, the computer 102 sets the settings to the default values. The computer 102 operates the adaptive cruise control using the adjusted settings if adjusted or the default values of the settings if not. The process 500 repeats until the vehicle 100 is turned off, at which time the computer 102 sets the settings of the adaptive cruise control to the default values.

The process 500 begins in a block 505, in which the computer 102 receives the inputs and data for setting the gain constant $g_k$, as described above.

Next, in a block 510, the computer 102 adjusts the gain constant gi, as described above.

Next, in a decision block 515, the computer 102 determines whether the status of the adaptive cruise control should be set to active or inactive. If the computer 102 received an input to activate the adaptive cruise control or if the computer 102 has received no input and the adaptive cruise control is already active, the computer 102 determines that the adaptive cruise control should be set to active. If the computer 102 received an input to deactivate the adaptive cruise control or if the computer 102 has received no input and the adaptive cruise control is already inactive, the computer 102 determines that the adaptive cruise control should be set to inactive. If the adaptive cruise control should be set to active, the process 500 proceeds to a block 520. If the adaptive cruise control should be set to inactive, the process 500 proceeds to a block 565.

In the block 520, the computer 102 receives weather data, e.g., via the transceiver 118.

Next, in a decision block 525, the computer 102 determines whether the weather data received in the block 520 indicates that inclement weather has started or ceased or indicates that the status of inclement weather is unchanged. The weather data can indicate inclement weather if, e.g., a storm watch or warning has been issued for the area in which the vehicle 100 is traveling, a chance of precipitation is above a precipitation threshold, etc. The precipitation threshold can be chosen to encompass percentages indicating a chance of continuous rainfall, e.g., 25%. The computer 102 can determine that inclement weather has either started or ceased if the determination of inclement weather has changed since a most recent previous iteration of the process 500, i.e., a previous determination of inclement weather and a current determination of no inclement weather or vice versa. In response to the data indicating that inclement weather has started or ceased, the process 500 proceeds to a block 530. In response to the status of inclement weather being unchanged, the process 500 proceeds to a decision block 535.

In the block 530, the computer 102 outputs a message to the operator, e.g., via the user interface 116. If inclement weather has started, the message indicates that the settings of the adaptive cruise control are being adjusted. If inclement weather has ceased, the message indicates that the settings of the adaptive cruise control are being adjusted to the default values. After the block 530, the process 500 proceeds to the decision block 535.

In the decision block 535, the computer 102 determines whether the weather data indicates inclement weather, as described above with respect to the decision block 525. In response to the data indicating inclement weather (either starting or continuing), the process 500 proceeds to a decision block 540. In response to the data indicating no inclement weather (either inclement weather ceasing or non-inclement weather continuing), the process 500 proceeds to a block 555.

In the decision block 540, the computer 102 determines whether the operator has provided an input, e.g., via the user interface 116, canceling the adjustment of the settings of the adaptive cruise control. If the computer 102 has not received that input, the process 500 proceeds to a block 545. If the computer 102 received an input canceling the adjustment of the settings, the process 500 proceeds to the block 555.

In the block 545, the computer 102 receives the speed s of the windshield wipers 104, either a set speed inputted by the operator as described above with respect to the block 405 of the process 400 or a determined speed determined by the computer 102 as described above with respect to the block 425 of the process 400.

Next, in a block 550, the computer 102 adjusts the settings of the adaptive cruise control based on the speed s of the windshield wipers 104, as described above. As the process 500 iterates, the computer 102 repeatedly adjusts the settings of the adaptive cruise control based on the speed s of the windshield wipers 104 as the windshield wipers 104 possibly change speed. After the block 550, the process 500 proceeds to a block 560.

In the block 555, the computer 102 adjusts the settings of the adaptive cruise control to the default values. After the block 555, the process 500 proceeds to the block 560.

In the block 560, the computer 102 operates the propulsion 106 and the brake system 112 in accordance with the settings of the adaptive cruise control, either in accordance with the adjusted settings from the block 550 or in accordance with the default values from to the block 555. After the block 560, the process 500 returns to the block 505 to restart the process 500.

In the block 565, i.e., after the decision block 515 if the adaptive cruise control should be set to inactive, the computer 102 deactivates the adaptive cruise control if active and permits manual operation, i.e., permits the operator control over the propulsion 106 and the brake system 112.

Next, in a decision block 570, the computer 102 determines whether the vehicle 100 has been turned off. If the vehicle 100 is still on, the process 500 returns to the block 505 to restart the process 500. If the vehicle 100 has been turned off, the process 500 proceeds to a block 575.

In the block 575, the computer 102 adjusts the settings of the adaptive cruise control to the default values. After the block 575, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive@ operating system, the Microsoft Windows@ operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory storing instructions executable by the processor to:
   receive a speed of windshield wipers of a vehicle;
   adjust a setting for an adaptive cruise control of the vehicle based on the speed of the windshield wipers, wherein the instructions to adjust the setting for the adaptive cruise control include instructions to adjust the setting to a second value determined by a gain applied to the speed of the windshield wipers; and
   instruct a propulsion of the vehicle to operate in accordance with the adjusted setting of the adaptive cruise control.

2. The computer of claim 1, wherein the adjusted setting includes a target speed of the vehicle.

3. The computer of claim 2, wherein the instructions to adjust the setting for the adaptive cruise control include instructions to decrease the target speed of the vehicle in response to an increase of the speed of the windshield wipers.

4. The computer of claim 1, wherein the adjusted setting includes a following distance from a leading vehicle.

5. The computer of claim 4, wherein the instructions to adjust the setting for the adaptive cruise control include instructions to increase the following distance in response to an increase of the speed of the windshield wipers.

6. The computer of claim 1, wherein the instructions further include instructions to adjust the gain in response to an input from an operator of the vehicle.

7. The computer of claim 1, wherein the instructions further include instructions to adjust the gain in response to a number of occupants of the vehicle.

8. The computer of claim 1, wherein the instructions further include instructions to adjust the gain based on a characteristic of a trailer hitched to the vehicle.

9. The computer of claim 1, wherein the instructions further include instructions to adjust the gain based on crowdsourced data received from a remote server.

10. The computer of claim 1, wherein the instructions to adjust the setting for the adaptive cruise control include instructions to adjust the setting based on the speed of the windshield wipers in response to receiving data indicating inclement weather.

11. The computer of claim 10, wherein the instructions further include instructions to, while continuing to receive data indicating the inclement weather, repeatedly adjust the setting based on the speed of the windshield wipers.

12. The computer of claim 1, wherein the instructions further include instructions to, in response to receiving data indicating inclement weather, output a message to an operator of the vehicle, and, in response to receiving an input canceling the adjustment of the setting of the adaptive cruise control, adjust the setting of the adaptive cruise control to a default value.

13. The computer of claim 1, wherein the instructions further include instructions to, in response to receiving data indicating that inclement weather has ceased, adjust the setting of the adaptive cruise control to a default value.

14. The computer of claim 1, wherein the instructions further include instructions to, in response to the vehicle being turned off, adjust the setting of the adaptive cruise control to a default value.

15. The computer of claim 1, wherein the speed of the windshield wipers is from a range of values including at least three values.

16. The computer of claim 1, wherein the instructions to instruct the propulsion to operate in accordance with the adjusted setting of the adaptive cruise control includes to instruct the propulsion to operate in accordance with the adjusted setting of the adaptive cruise control in response to an input from an operator to activate the adaptive cruise control.

17. The computer of claim 16, wherein the instructions further include instructions to permit manual operation of the propulsion in response to an input from the operator deactivating the adaptive cruise control.

18. A method comprising:
   receiving a speed of windshield wipers of a vehicle;
   adjusting a setting for an adaptive cruise control of the vehicle based on the speed of the windshield wipers, wherein adjusting the setting for the adaptive cruise control includes adjusting the setting to a second value determined by a gain applied to the speed of the windshield wipers; and
   instructing a propulsion of the vehicle to operate in accordance with the adjusted setting of the adaptive cruise control.

19. A computer comprising a processor and a memory storing instructions executable by the processor to:
   receive a speed of windshield wipers of a vehicle;
   adjust a setting for an adaptive cruise control of the vehicle based on the speed of the windshield wipers;

instruct a propulsion of the vehicle to operate in accordance with the adjusted setting of the adaptive cruise control; and in response to receiving data indicating that inclement weather has ceased, adjust the setting of the adaptive cruise control to a default value.

20. The computer of claim 19, wherein the instructions further include instructions to, in response to receiving the data indicating that the inclement weather has ceased, output a message to the operator indicating that the setting of the adaptive cruise control is being adjusted to the default value.

* * * * *